US009832388B2

(12) United States Patent
Motta et al.

(10) Patent No.: US 9,832,388 B2
(45) Date of Patent: Nov. 28, 2017

(54) DEINTERLEAVING INTERLEAVED HIGH DYNAMIC RANGE IMAGE BY USING YUV INTERPOLATION

(71) Applicant: NVIDIA Corporation, Santa Clara, CA (US)

(72) Inventors: Ricardo Motta, Palo Alto, CA (US); Brian Cabral, San Jose, CA (US); Sean Pieper, Mountain View, CA (US); Ross Cunniff, Fort Collins, CO (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/451,031

(22) Filed: Aug. 4, 2014

(65) Prior Publication Data

US 2016/0037044 A1    Feb. 4, 2016

(51) Int. Cl.
*H04N 5/235*    (2006.01)
*G06T 3/40*     (2006.01)
(Continued)

(52) U.S. Cl.
CPC ......... *H04N 5/2355* (2013.01); *G06T 3/4015* (2013.01); *G06T 3/4069* (2013.01); *G06T 5/007* (2013.01); *G06T 5/009* (2013.01); *G06T 5/50* (2013.01); *H04N 5/2353* (2013.01); *H04N 5/35536* (2013.01); *H04N 5/35554* (2013.01); *H04N 5/35563* (2013.01); *H04N 9/045* (2013.01); *H04N 9/64* (2013.01);
(Continued)

(58) Field of Classification Search
CPC ............. H04N 5/2355; H04N 5/35536; H04N 5/2353; H04N 5/35563; H04N 5/35554; G06T 3/4015; G06T 3/4069; G06T 5/009; G06T 2200/32; G06T 2207/10024; G06T 2207/10144; G06T 2210/61; G06T 2207/10004
See application file for complete search history.

(56) References Cited

U.S. PATENT DOCUMENTS 5,032,903 A    7/1991 Suzuki et al.
5,081,594 A    1/1992 Horsley
(Continued)

FOREIGN PATENT DOCUMENTS

EP    2143280    1/2010
TW    200820131  5/2008

*Primary Examiner* — Padma Haliyur

(57) ABSTRACT

Systems and methods for generating high dynamic images from interleaved Bayer array data with high spatial resolution and reduced sampling artifacts. Bayer array data are demosaiced into components of the YUV color space before deinterleaving. The Y component and the UV components can be derived from the Bayer array data through demosiac convolution processes. A respective convolution is performed between a convolution kernel and a set of adjacent pixels of the Bayer array that are in the same color channel. A convolution kernel is selected based the mosaic pattern of the Bayer array and the color channels of the set of adjacent pixels. The Y data and UV data are deinterleaved and interpolated into frames of short exposure and long exposures in the second color space. The short exposure and long exposure frames are then blended and converted back to a RGB frame representing a high dynamic range image.

20 Claims, 12 Drawing Sheets

(51) Int. Cl.
*G06T 5/00* (2006.01)
*H04N 5/355* (2011.01)
*G06T 5/50* (2006.01)
*H04N 9/04* (2006.01)
*H04N 9/64* (2006.01)
*H04N 9/76* (2006.01)

(52) U.S. Cl.
CPC ........... *H04N 9/76* (2013.01); *G06T 2200/12* (2013.01); *G06T 2200/32* (2013.01); *G06T 2207/10004* (2013.01); *G06T 2207/10024* (2013.01); *G06T 2207/10144* (2013.01); *G06T 2207/20208* (2013.01); *G06T 2207/20221* (2013.01); *G06T 2210/61* (2013.01)

(56) References Cited

U.S. PATENT DOCUMENTS

| | | |
|---|---|---|
| 5,287,438 A | 2/1994 | Kelleher |
| 5,313,287 A | 5/1994 | Barton |
| 5,335,322 A | 8/1994 | Mattison |
| 5,392,396 A | 2/1995 | MacInnis |
| 5,432,898 A | 7/1995 | Curb et al. |
| 5,446,836 A | 8/1995 | Lentz et al. |
| 5,452,104 A | 9/1995 | Lee |
| 5,452,412 A | 9/1995 | Johnson, Jr. et al. |
| 5,483,258 A | 1/1996 | Cornett et al. |
| 5,570,463 A | 10/1996 | Dao |
| 5,594,854 A | 1/1997 | Baldwin et al. |
| 5,623,692 A | 4/1997 | Priem et al. |
| 5,633,297 A | 5/1997 | Valko et al. |
| 5,664,162 A | 9/1997 | Dye |
| 5,748,904 A | 5/1998 | Huang et al. |
| 5,815,162 A | 9/1998 | Levine |
| 5,854,631 A | 12/1998 | Akeley et al. |
| 5,854,637 A | 12/1998 | Sturges |
| 5,872,902 A | 2/1999 | Kuchkuda et al. |
| 5,977,987 A | 11/1999 | Duluk, Jr. |
| 5,990,904 A | 11/1999 | Griffin |
| 6,028,608 A | 2/2000 | Jenkins |
| 6,034,699 A | 3/2000 | Wong et al. |
| 6,072,500 A | 6/2000 | Foran et al. |
| 6,104,407 A | 8/2000 | Aleksic et al. |
| 6,104,417 A | 8/2000 | Nielsen et al. |
| 6,115,049 A | 9/2000 | Winner et al. |
| 6,118,394 A | 9/2000 | Dnaya |
| 6,128,000 A | 10/2000 | Jouppi et al. |
| 6,137,918 A | 10/2000 | Harrington et al. |
| 6,160,559 A | 12/2000 | Omtzigt |
| 6,188,394 B1 | 2/2001 | Morein et al. |
| 6,201,545 B1 | 3/2001 | Wong et al. |
| 6,204,859 B1 | 3/2001 | Jouppi et al. |
| 6,219,070 B1 | 4/2001 | Baker et al. |
| 6,249,853 B1 | 6/2001 | Porterfield |
| 6,359,623 B1 | 3/2002 | Larson |
| 6,362,819 B1 | 3/2002 | Dalal et al. |
| 6,366,289 B1 | 4/2002 | Johns |
| 6,429,877 B1 | 8/2002 | Stroyan |
| 6,437,780 B1 | 8/2002 | Baltaretu et al. |
| 6,452,595 B1 | 9/2002 | Montrym et al. |
| 6,469,707 B1 | 10/2002 | Voorhies |
| 6,490,058 B1 | 12/2002 | Takabatake et al. |
| 6,501,564 B1 | 12/2002 | Schramm et al. |
| 6,504,542 B1 | 1/2003 | Voorhies et al. |
| 6,522,329 B1 | 2/2003 | Ihara et al. |
| 6,525,737 B1 | 2/2003 | Duluk, Jr. et al. |
| 6,529,207 B1 | 3/2003 | Landau et al. |
| 6,606,093 B1 | 8/2003 | Gossett et al. |
| 6,614,444 B1 | 9/2003 | Duluk, Jr. et al. |
| 6,624,823 B2 | 9/2003 | Deering |
| 6,633,197 B1 | 10/2003 | Sutardja |
| 6,633,297 B2 | 10/2003 | McCormack et al. |
| 6,646,639 B1 | 11/2003 | Greene et al. |
| 6,664,961 B2 | 12/2003 | Ray et al. |
| 6,671,000 B1 | 12/2003 | Cloutier |
| 6,683,979 B1 | 1/2004 | Walker et al. |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,704,026 B2 | 3/2004 | Kurihara et al. |
| 6,717,578 B1 | 4/2004 | Deering |
| 6,741,247 B1 | 5/2004 | Fenney |
| 6,747,057 B2 | 6/2004 | Ruzafa et al. |
| 6,765,575 B1 | 7/2004 | Voorhies et al. |
| 6,778,177 B1 | 8/2004 | Furtner |
| 6,788,301 B2 | 9/2004 | Thrasher |
| 6,798,410 B1 | 9/2004 | Redshaw et al. |
| 6,819,332 B2 | 11/2004 | Baldwin |
| 6,825,847 B1 | 11/2004 | Molnar et al. |
| 6,833,835 B1 | 12/2004 | van Vugt |
| 6,906,716 B2 | 6/2005 | Moreton et al. |
| 6,940,514 B1 | 9/2005 | Wasserman et al. |
| 6,947,057 B2 | 9/2005 | Nelson et al. |
| 6,978,317 B2 | 12/2005 | Anantha et al. |
| 7,009,607 B2 | 3/2006 | Lindholm et al. |
| 7,009,615 B1 | 3/2006 | Kilgard et al. |
| 7,064,771 B1 | 6/2006 | Jouppi et al. |
| 7,075,681 B1 | 7/2006 | Brothers |
| 7,081,902 B1 | 7/2006 | Crow et al. |
| 7,119,809 B1 | 10/2006 | McCabe |
| 7,126,600 B1 | 10/2006 | Fowler et al. |
| 7,154,066 B2 | 12/2006 | Talwar et al. |
| 7,158,148 B2 | 1/2007 | Toji et al. |
| 7,170,515 B1 | 1/2007 | Zhu |
| 7,184,040 B1 | 2/2007 | Tzvetkov |
| 7,224,364 B1 | 5/2007 | Yue et al. |
| 7,307,628 B1 | 12/2007 | Goodman et al. |
| 7,382,368 B1 | 6/2008 | Molnar et al. |
| 7,403,212 B2 | 7/2008 | Schick et al. |
| 7,453,466 B2 | 11/2008 | Hux et al. |
| 7,479,965 B1 | 1/2009 | King et al. |
| 7,548,996 B2 | 6/2009 | Baker et al. |
| 7,551,174 B2 | 6/2009 | Lourcha et al. |
| 7,692,659 B1 | 4/2010 | Molnar et al. |
| 7,791,617 B2 | 9/2010 | Crow et al. |
| 7,978,921 B1 | 7/2011 | Donovan |
| 8,031,977 B2 | 10/2011 | Min et al. |
| 8,063,903 B2 | 11/2011 | Vignon et al. |
| 8,116,579 B2 | 2/2012 | Fenney et al. |
| 8,427,487 B1 | 4/2013 | Crow |
| 8,605,104 B1 | 12/2013 | McAllister et al. |
| 8,660,347 B2 | 2/2014 | Tamura |
| 8,670,613 B2 | 3/2014 | McAllister et al. |
| 2001/0038642 A1 | 11/2001 | Alvarez et al. |
| 2002/0114461 A1 | 8/2002 | Shimada |
| 2003/0020741 A1 | 1/2003 | Boland |
| 2003/0201994 A1 | 10/2003 | Taylor |
| 2004/0086177 A1 | 5/2004 | Zhang et al. |
| 2005/0213128 A1 | 9/2005 | Imai et al. |
| 2006/0170703 A1 | 8/2006 | Liao |
| 2007/0002165 A1 | 1/2007 | Parks |
| 2007/0268298 A1 | 11/2007 | Alben et al. |
| 2008/0218599 A1 | 9/2008 | Klijn et al. |
| 2008/0247641 A1 | 10/2008 | Rasmusson et al. |
| 2009/0295816 A1 | 12/2009 | Kallio |
| 2009/0295941 A1 | 12/2009 | Nakajima et al. |
| 2010/0060629 A1 | 3/2010 | Rasmusson et al. |
| 2010/0309333 A1 | 12/2010 | Smith et al. |
| 2011/0074980 A1 | 3/2011 | Border et al. |
| 2011/0090361 A1 | 4/2011 | Kobayashi et al. |
| 2011/0122273 A1* | 5/2011 | Kanemitsu ............ H04N 9/045 348/222.1 |
| 2012/0050303 A1 | 3/2012 | McAllister et al. |
| 2012/0113787 A1 | 5/2012 | Komma et al. |
| 2012/0183215 A1 | 7/2012 | Van Hook et al. |
| 2013/0021352 A1 | 1/2013 | Wyatt et al. |
| 2013/0083226 A1 | 4/2013 | Kwan et al. |
| 2013/0208138 A1 | 8/2013 | Li et al. |
| 2013/0242133 A1* | 9/2013 | Li .................... H04N 5/2355 348/229.1 |
| 2014/0063300 A1 | 3/2014 | Lin et al. |
| 2014/0184612 A1 | 7/2014 | Dunaisky et al. |

\* cited by examiner

Y at R (310)

| | | | | | | |
|---|---|---|---|---|---|---|
| | | | 0.014250 | -0.094750 | | |
| | -0.047375 | 0.073375 | 0.146750 | 0.042750 | | |
| | | | 0.583050 | 0.220125 | | |
| | | | 0.146750 | 0.042750 | | |
| | -0.047375 | 0.014250 | | | | |
| | | | -0.094750 | | | |

312, 313, 314, 315

Y at G2 (320)

| | | | | | | |
|---|---|---|---|---|---|---|
| | | | | 0.004438 | | |
| | | -0.077438 | 0.057000 | -0.025813 | | |
| | -0.015125 | 0.224250 | 0.814875 | 0.074750 | -0.015125 | |
| | | -0.077438 | 0.057000 | -0.025813 | | |
| | 0.004438 | | | | | |

Y at G1 (330)

| | | | | | | |
|---|---|---|---|---|---|---|
| | | | -0.030250 | | | |
| | -0.025813 | 0.146500 | -0.077438 | | | |
| | 0.002213 | 0.028500 | 0.849563 | 0.085500 | 0.002213 | |
| | -0.025813 | 0.146500 | -0.077438 | | | |
| | -0.030250 | | | | | |

Y at B (340)

| | | | | | | |
|---|---|---|---|---|---|---|
| | | | | -0.129438 | | |
| | | 0.112125 | 0.146750 | 0.037375 | | |
| | -0.064719 | 0.201125 | 0.502313 | 0.073375 | -0.064719 | |
| | | 0.112125 | 0.146750 | 0.037375 | | |
| | -0.129438 | | | | | |

DEINTERLEAVING INTERLEAVED HIGH DYNAMIC RANGE IMAGE BY USING YUV INTERPOLATION

TECHNICAL FIELD

The present disclosure relates generally to the field of digital image processing and, more specifically, to the field of high dynamic range (HDR) image processing.

BACKGROUND

Real-world scenes often exhibit a wider range of brightness than can be captured by most camera system with a single exposure level. A captured image, e.g., by a digital camera, may include both very bright regions and very dark regions. Ideally, a photograph of a large brightness range scene would include both the details in the bright regions and the details in the dark regions. However, due to dynamic range limits of software and hardware of the imaging device, e.g., a digital still camera, an image capturing a high contrast scene is usually incapable of preserving the high dynamic range (ratio between dark and bright regions) of the entire scene as its original appearance. Typically, in a single exposure setting, the very bright region tends to become saturated and the very dark region tends to become underexposed, and thereby can hardly be reproduced in one captured frame without distortion.

One technique used to obtain an image with a high dynamic range is by capturing multiple still images of the same resolution having different exposure levels, and then combining the images into a single output image having increased dynamic range. Another method for obtaining a high dynamic range image is the simultaneous capture of multiple images having different exposure levels. The images are subsequently combined into a single output image having increased dynamic range. This capture process can be achieved through the use of multiple imaging paths and sensors.

A recently developed technology, e.g., the so-called "Always-on High Dynamic Range (AOHDR)," takes a different approach in which the image sensor of an imaging device are programmed to capture a short exposure image and a long exposure image simultaneously in different pixel locations. The short and long exposure images are interleaved in the raw mosaiced output of the sensor, typically in a Bayer array pattern resulted from the use of a Bayer filter on the image sensor. FIG. 1 illustrates a sample Bayer mosaic array representing interleaved high dynamic range (HDR) image data including alternating pairs of scanlines of short exposure and long exposure pixels. The Bayer array basically is composed of repeating units of 2×2 pixels, including one R, one B and 2Gs. In this interleaved pattern, each two adjacent long exposure pixel rows, e.g., 101A and 101B, alternates with two adjacent short exposure pixel rows, e.g., 102A and 102B. The short and long exposure images are captured contemporaneously by the digital camera system.

The process of deinterleaving the interleaved Bayer array can be complicated. Taking FIG. 1 as example, the long exposure and short exposure rows do not have the same pixels, but are spatially aligned with the source sensor cells. Therefore, to deinterleave the image, short and long exposure lines need to be recreated from adjacent pairs of short and long exposure lines. Conventionally, an interleaved raw image is deinterleaved in the Bayer mosaic space. Unfortunately, this has significantly lower spatial resolution than the original image and leads to sampling artifacts. The lower spatial resolution is a result of the fact that one can only perform arithmetic operations between components of the same color filter value, e.g., red with red, green with green, and blue with blue. For example, the attempt to deinterleave the red (R) component has only ¼ of the possible image information available. These sampling artifacts in both luma and chroma, or the aliasing effect, are visually objectionable and yet are common in high-contrast images.

SUMMARY OF THE INVENTION

Therefore, it would be advantageous to provide a mechanism to generate high dynamic images from interleaved source image data with high spatial resolution and reduced sampling artifacts. Accordingly, embodiments of the present disclosure employ a computer implemented method of demosaicing the source image data into components of an intermediate color space (e.g., YUV) before deinterleaving (and interpolation). Thereby, the source image can be sampled at significantly higher frequency, which advantageously leads to a substantial improvement in image quality.

More specifically, the source image data may be arranged in a Bayer array comprising alternate row pairs of a long exposure and a short exposure image, and the intermediate color space may be a YUV color space. The intensity (Y) component and the chroma (UV) components can be derived (extracted) from the Bayer array data through demosiac convolution processes. A respective convolution is performed between a convolution kernel and a set of adjacent pixels of the Bayer array that are in the same color channel. A convolution kernel is selected based the mosaic pattern of the Bayer array and the color channels of the set of adjacent pixels. The intensity component and the chroma components can then be deinterleaved and interpolated into frames of short exposure and long exposures in the second color space. The short exposure and long exposure frames are then blended to create the high dynamic range image which may be converted back to a RGB frame representing a high dynamic range image.

In accordance with an embodiment of the present disclosure, a method of processing digital image data comprises: (1) accessing first image data representing a captured image that comprises a plurality of pixels represented by a first color space and arrranged in a Bayer array, wherein the plurality of pixels comprise: first exposure pixels associated with a first exposure duration of the captured image; and second exposure pixels associated with a second exposure duration of the captured image, and wherein the first exposure pixels and the second exposure pixels are interleaved in the Bayer array; (2) determining first luminance data and first chrominance data from the first exposure pixels of the first image data, wherein the first luminance data and the first chrominance data are represented by a second color space; (3) determining second luminance data and second chrominance data from the second exposure pixels of the first image data, wherein the second luminance data and the second chrominance data are represented by the second color space; (4) interpolating the first luminance data and the first chrominance data to produce a first exposure image; (5) interpolating the second luminance data and the second chrominance data to produce a second exposure image; and (6) generating a blended image of the second color space by blending the first exposure image and the second exposure image.

The first color space may be an RGB color space, and the second color space may be a YUV color space. The first image data may be converted to interleaved luminance data and interleaved chrominance data. Then, the interleaved luminance data may be deinterleaved to the first luminance data and the second luminance data; and the interleaved chrominance data may be deinterleaved data to the first chrominance data and the second chrominance data. The first image data may be converted by: determining a Y value for each pixel of the plurality of pixels by performing a convolution between a Y demosaicing kernel and the first image data of each pixel and neighbor pixels of each pixel; determining a U value for each horizontal pair of pixels of the plurality of pixels by performing a convolution between a U demosaicing kernel and the first image data for each horizontal pair and neighbor pixels of each horizontal pair; and determining a V value for each horizontal pair by performing a convolution between a V demosaicing kernel and the first image data for each horizontal pair and neighbor pixels of each horizontal pair. The neighbor pixels of each pixel may be associated with the same exposure duration as each pixel. The neighbor pixels of each horizontal pair may be associated with the same exposure duration as each horizontal pair. The luminance data and chrominance data may be interpolated in accordance with a minimum delta diagonal method.

In another embodiment of present disclosure, a computer implemented method of generating a high dynamic range (HDR) image comprises: (1) accessing interleaved image data representing a captured frame that comprises a plurality of pixels, wherein the plurality of pixels comprise first exposure pixels associated with a first exposure duration; and second exposure pixels associated with a second exposure duration, wherein the interleaved image data are represented by a first color space and arranged in a mosaic pattern, and wherein the first exposure pixels and the second exposure pixels are interleaved in a predetermined pattern; (2) generating first exposure data in a second color space from the first exposure pixels of the captured frame; (3) generating second exposure data in the second color space from the second exposure pixels of the captured frame; and (4) generating a resultant image representing the captured frame in the first color space based on blending the first exposure data with the second exposure data.

In another embodiment of present disclosure, a system comprises: a processor; and a memory coupled to the processor and storing an image processing program. The image processing program comprising instructions that cause the processor to perform a method of generating a high dynamic range image. The method comprises: (1) accessing interleaved image data representing a captured frame that comprises a plurality of pixels, wherein the plurality of pixels comprise first exposure pixels associated with a first exposure duration; and second exposure pixels associated with a second exposure duration, wherein the interleaved image data are arranged in a Bayer pattern, and wherein the first exposure pixels and the second exposure pixels are interleaved by alternating scanline pairs; (2) deriving first exposure data in a YUV color space from the first exposure pixels of the interleaved image data, wherein the first exposure data represent the captured frame; (3) deriving second exposure data in the YUV color space from the second exposure pixels of the interleaved image data, wherein the second exposure data represent the captured frame; and (4) generating a high dynamic range image represented by the first color space based on the first exposure data and the second exposure data.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which:

FIG. 3 provides exemplary convolution kernels that can be used in the convolution processes to extract Y component data from interleaved Bayer array data in accordance with an embodiment of the present disclosure.

FIG. 4 presents intermediate kernels that are generated during the exemplary process of deriving Y convolution kernels from RGB demosaicing kernel.

FIG. 6A presents the intermediate U/V demosaicing kernels before the long/short exposure row interleaving pattern is taken into account.

FIG. 6B presents the intermediate U/V demosaicing kernels with the long/short exposure row interleaving pattern being taken into account.

DETAILED DESCRIPTION

Figure 1:
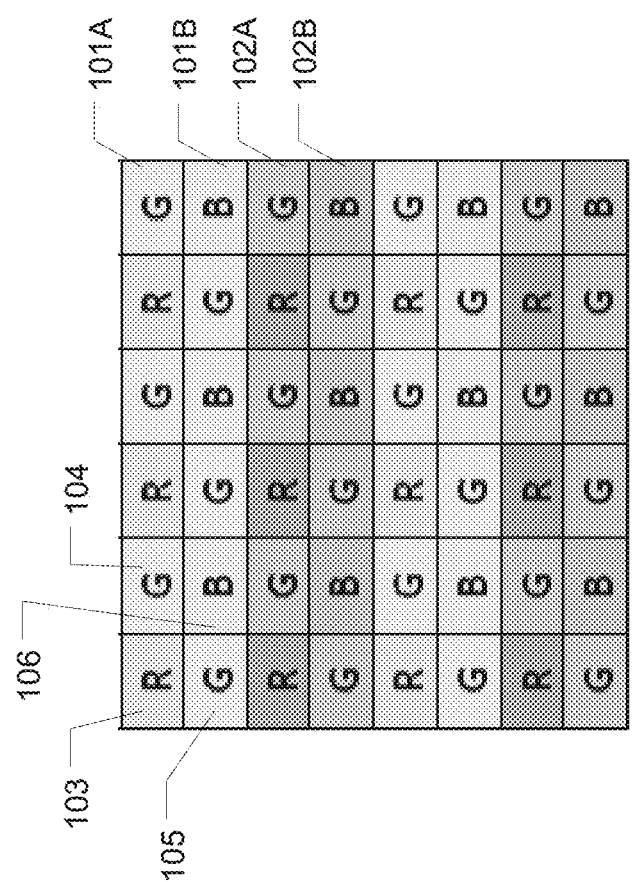
FIG. 1 illustrates a sample Bayer mosaic array in RGB space representing interleaved high dynamic range (HDR) image data as s source input including alternating pairs of scanlines of short exposure and long exposure pixels.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Deinterleaving Interleaved High Dynamic Range Image by Using YUV Interpolation

Figure 2A:
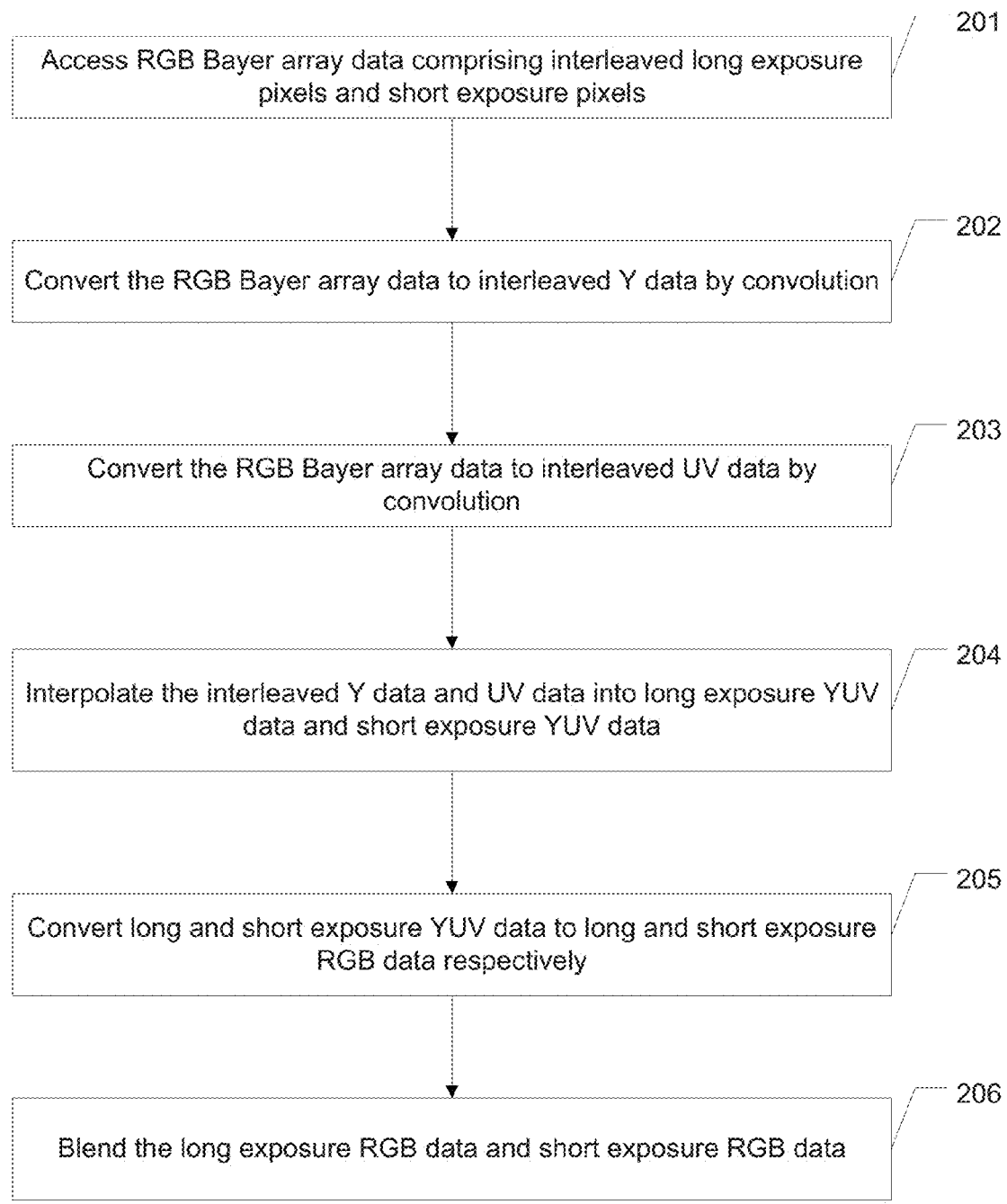
FIG. 2A is a flow chart illustrating an exemplary computer implemented method of generating a HDR image from Bayer array source data by deinterleaving in YUV space in accordance with an embodiment of the present disclosure.

FIG. 2A is a flow chart illustrating an exemplary computer implemented method 200 of generating a high dynamic range (HDR) image from Bayer array source data in RGB space by deinterleaving in YUV space in accordance with an embodiment of the present disclosure. Method 200 can be implemented as software program, hardware logic, or a combination thereof.

At 201, a set of RGB Bayer array source data representing a captured frame including interleaved long exposure pixels and short exposure pixels are accessed. For instance, the source data may correspond to raw data of a still image or a frame of a video captured by a digital camera equipped with a Bayer filter. Alternatively, the source data may correspond to computer simulated data representing an interleaved HDR image.

The Bayer array source data can be represented by FIG. 1 with alternating two pairs of short exposure (101A, 101B) and long exposure (102A, 102B). The alternating row pairs represent a long exposure image and a short exposure image interleaved together and typically captured contemporaneously by a digital imaging device.

At 202, the RGB source frame is demosaiced into intensity data of the captured frame represented in a selected intermediate color space, for example Y image data in the YUV space. As will be described in greater detail below, a convolution method can be used for the demosaic process in some embodiments. Thus, the resultant Y image data comprise interleaved long exposure pixels and short exposure pixels and can have the same resolution as the source data.

At 203 of FIG. 2, the RGB source frame is demosaiced into chroma data, e.g., UV data, represented in the same intermediate color space. A convolution method may be used for this chroma extraction. Similarly, the resultant UV image data comprise interleaved long exposure pixels and short exposure pixels (half frame each). As will be described in greater detail, in some embodiments, the resultant UV data may have the same resolution as or a lower resolution than the Bayer array source data.

At 204, the interleaved YUV data are interpolated into full frame long and short exposure YUV data. At 205, the interpolated long and short exposure YUV data may be converted to long and short exposure RGB data respectively which are eventually blended to generate the HDR image at 206. Thus, by demosaicing the source image data into YUV space data before deinterleaving, the source image can be sampled at higher frequency, e.g., a full resolution, than in the conventional art, resulting in significantly improved HDR image quality. Alternatively, YUV short- and long exposure image can be directly blended to create a high dynamic range resultant image in YUV space which can then be translated to RGB space.

As will be appreciated by those skilled in the art, the present disclosure is not limited to any specific pattern of interleaving the long exposure data pixels and short exposure pixels. The source data comprising alternating pairs of scanlines as shown in FIG. 1 is exemplary only. In some embodiments, a captured frame may include pixels captured in more than two exposure settings.

Although embodiments of the present disclosure are described with reference to the YUV space as the intermediate color space in the demosaicing processes, it will be appreciated that other intermediate color spaces may be used and as well and could lead to improved image quality with efficient implementation in accordance with the present disclosure. More specifically, an RGB source image may be demosaiced into respective color channel data of any suitable intermediate color space before deinterleaving, such as a YIQ space, a YCbCr space, an HSL space, and etc.

The intensity and chroma components of the interleaved source data can be extracted by convolution processes. With respect to a respective sampled pixel of the interleaved source data, a corresponding convolution kernel is applied on the sampled pixel and its neighbor pixels to perform the convolution. The convolution kernels can be designed such that the opposite-exposure pixels are not mixed with current-intensity pixels, since their response curves are different even after exposure compensation. Accordingly, a convolution only affects the neighbor pixels associated with the same exposure settings as the sampled pixel, e.g., long exposure only pixels or short exposure only pixels.

The present disclosure is not limited to any specific order of executing steps 201-206 of method 200. In some embodiments, method 200 can be implemented as a three-pass computation process, in which the first pass includes step 202, the second pass includes step 203, and the third pass includes steps 205-206. In some other embodiments, method 200 can be implemented as a two-pass computation process, in which Y is demosaiced and RGB data are recreated at the minimum diagonal endpoints on the fly. In still some other embodiments, method 200 can be implemented as a four-pass computation process, in which full resolution Y, U and V images are demosaiced and used for 205 and 206.

Figure 2B:
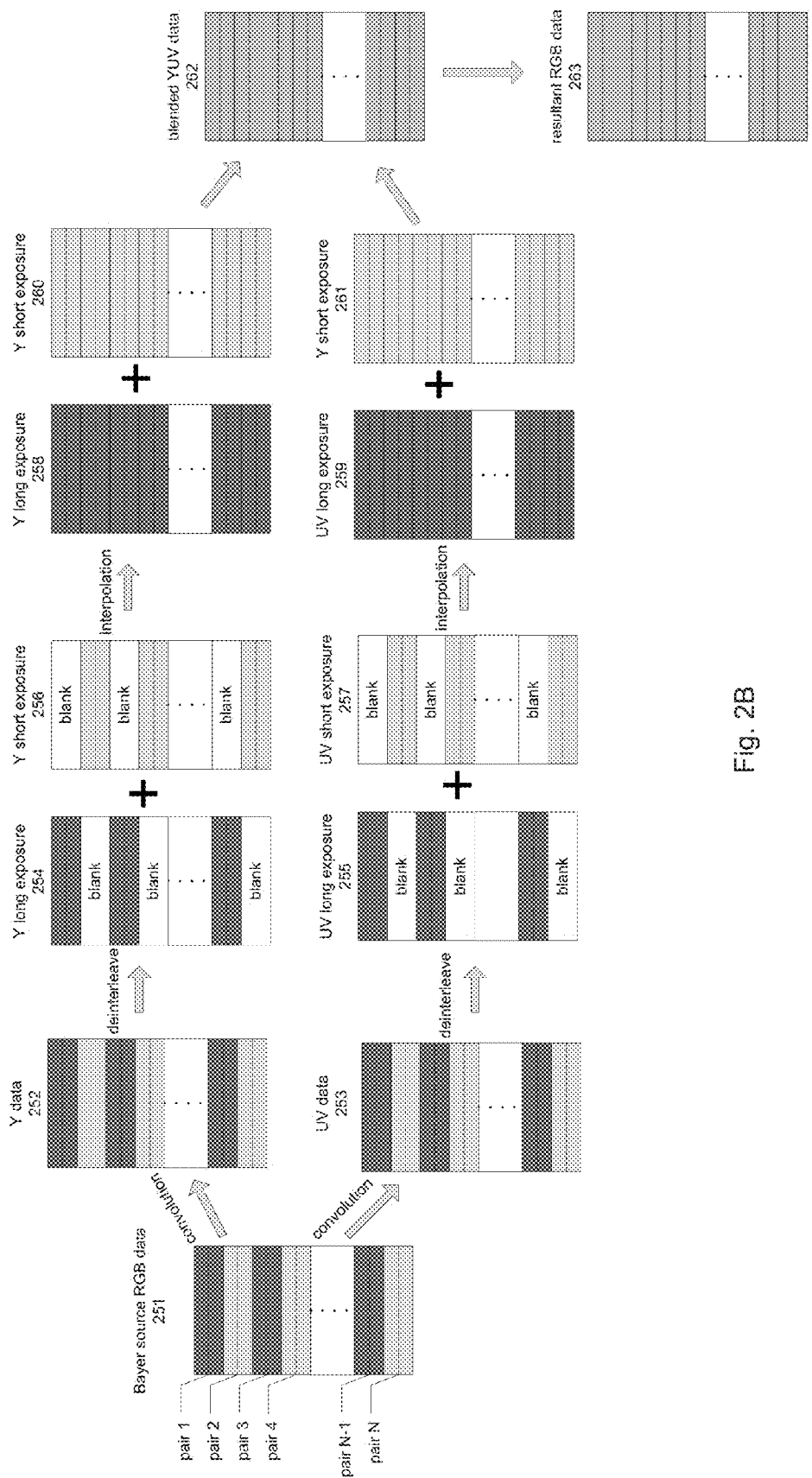
FIG. 2B illustrates an exemplary process of generating resultant RGB high dynamic range frame from a Bayer source RGB frame in accordance with an embodiment of the present disclosure.

FIG. 2B illustrates an exemplary process of generating resultant RGB high dynamic range frame 263 from a Bayer source RGB frame 251 in accordance with an embodiment of the present disclosure. In the illustrated example, the Bayer source RGB frame 251 includes N pairs of scanlines, pair 1, 2, . . . , N, with alternating, or interleaved, long exposure scanline pair (dark) and short exposure scanline pair (light). Though respective convolution processes, a interleaved Y frame 252 and an interleaved UV frame 253 are generated from the Bayer source RGB frame 251.

Each of the interleaved Y frame 252 and the interleaved UV frame 253 is deinterleaved into a long exposure frame (254 and 255) and a short exposure frame (256 and 257). The long exposure frames (254 and 255) include only data of pixels captured in the long exposure setting; and the short exposure frames (256 and 257) include only data of pixels captured in the short exposure setting. For instance, each of 254, 255, 256, and 257 contains half frame information, which is converted to full frame (258, 259, 260 and 261) by interpolation. The full frame long/short exposure Y/UV data 258, 259, 260 and 261 are blended into a YUV frame 262 which are eventually converted to a RGB frame for display.

FIG. 3 provides exemplary convolution kernels 310, 320, 330, and 340 that can be used in the convolution processes to extract Y component data from interleaved Bayer array data in accordance with an embodiment of the present disclosure. For a particular Bayer array pattern, four different Y kernels are used, each corresponding to a different color channel, e.g., R, G1, G2, and B corresponding to kernels 310, 330, 320 and 340, respectively. In this example, the Bayer array data include interleaved row pairs of long exposure and short exposure pixels and arranged in an RG/GB phase order, as shown in FIG. 1. Each of the convolution kernels 310, 320, 330, or 340 is configured as a 9×5 grid that has 13 taps. Taking the kernel 310 as an example, the center tap (with the value of 0.583250) corresponds to the currently sampled pixel. The empty rows 312-315 correspond to the neighbor pixels associated with the opposite exposure setting which are excluded from the present convolution computation.

The convolution kernels shown in FIG. 3 can be adapted to apply on a Bayer array of any phase order. To apply on a Bayer array of a GR/GB phase order, the kernels shown in FIG. 3 should be mirrored left-to-right. To apply on a Bayer array of a GB/RG phase order, the kernels shown in FIG. 3 should be mirrored top-to-bottom. To apply on a Bayer array of a BG/GR phase order, the kernels shown in FIG. 3 should be mirrored left-to-right and top-to-bottom which is equivalent to a 180-degree rotation.

In some embodiments, during the convolution process, the currently sampled pixel can be normalized; the black bias can be subtracted; and white balancing can be performed on each source pixel, which is clamped to the [0-1] range before convolution. The resulting Y value can be clamped to a minimum of zero. If the currently sampled pixel is on a short exposure row, the Y value can be multiplied by the long/short exposure ratio. The resultant values can be stored as a normalized FP 16 number, FP 20 number, or any other suitable format. For example, the bits of an FP 20 image component can be encoded into an 8-bit MRT image.

Figure 4:
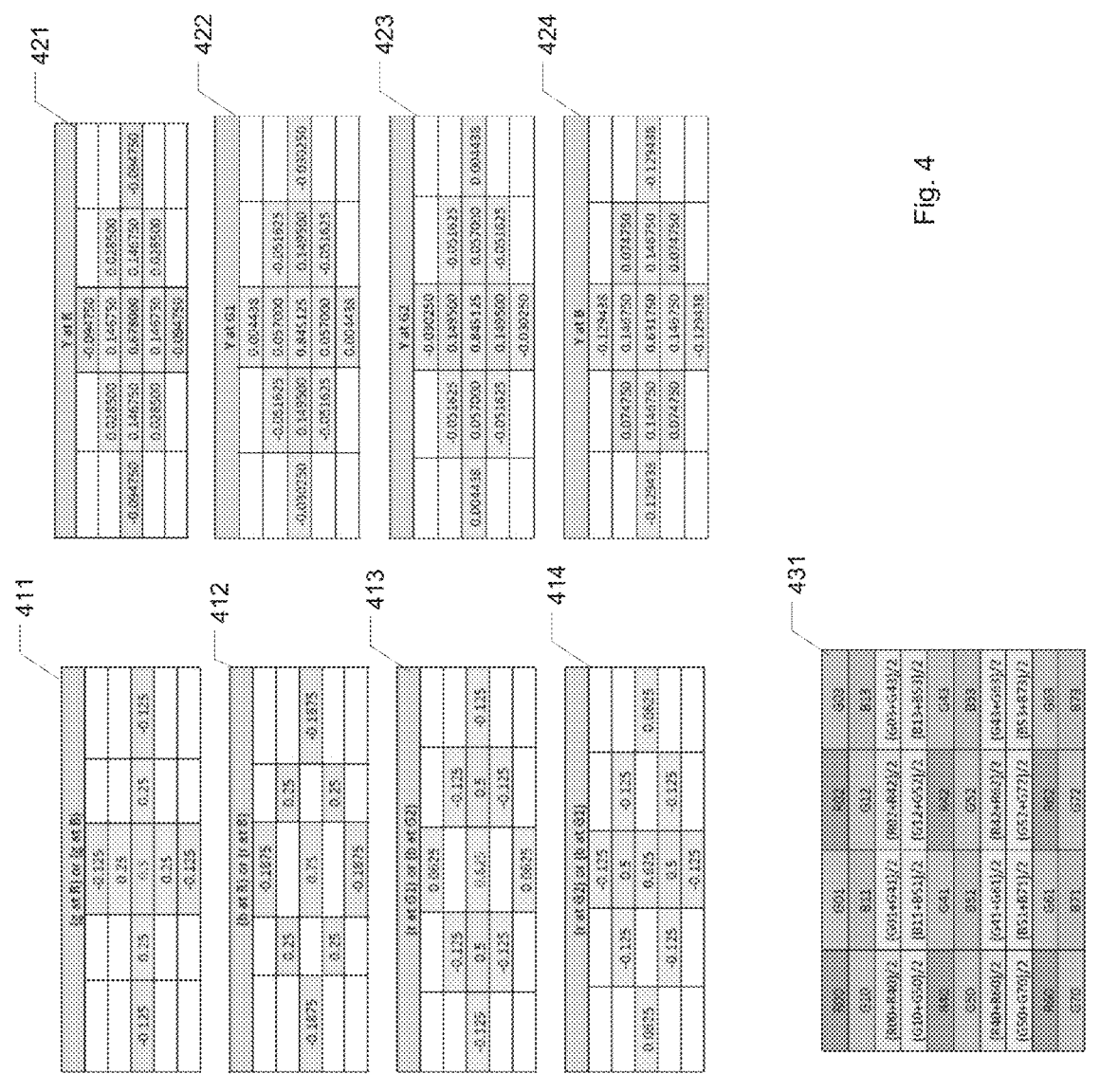

The Y convolution kernels presented in FIG. 3 can be derived based on known RGB demosaicing kernels. FIG. 4 presents intermediate kernels that are generated during the exemplary process of deriving Y convolution kernels from RGB demosaicing kernel 411-414. Provided with a set of RGB demosaicing kernels 411-414 that is well known in the art, simple combination and arithmetic on these kernels 411-414 using the industry-standard calculation of $$Y=0.229R+0.589G+0.114B$$

can yield the 13-tap Y kernels 421-424 which should then be adapted to the interleaving pattern of the HDR source image. For instance, raw AOHDR source images have interleaved short and long exposure rows which should be kept separated in individual convolution processes. Therefore, pixels can be synthesized for the opposite-exposure row assuming a simple linear interpolation between rows of the same exposure as the current row. The interpolated neighborhood is shown in the array 431.

Applying the Y demosaicing kernels 421-424 to the neighborhood produces the final Y demosaicing kernels shown in FIG. 3.

The kernels are essentially redistributed based on the following algebra for a single column kernel $K_0, K_1, K_2, K_3, K_4$] applied to an image column [$I_2, I_3, I_4, I_5, I_6$]:

$$C=I_2K_0+I_3K_1+I_4K_2+I_5K_3+I_6K_4 \quad \text{(eq. 1)}$$

For an even row, $I_2=(I_0+I_4)/2$, $I_3=(I_1+I_5)/2$, and $I_6=(I_4+I_8)/2$, and the equation for a column is represented as:

$$C=(I_0+I_4)K_0/2+(I_1+I_5)K_1/2+I_4K_2+I_5K_3+(I_4+I_8)K_4/2 \quad \text{(eq. 2)}$$

This redistributes to the following equation:

$$C=I_0(K_0/2)+I_1K_1/2+I_4((K_0+K_4)/2+K_2)+I_5(K_1/2+K_3)+I_8K_4/2 \quad \text{(eq. 3)}$$

This is equivalent to convolution of the image column: [$I_0, I_1, I_2, I_3, I_4, I_5, I_6, I_7, I_8$] with the single column kernel $$[K_0/2, K_1/2, 0, 0, (K_0+K_4)/2+K_2, K_1/2+K_3, 0, 0, K_4/2]. \quad \text{(eq. 4)}$$

This translates directly from the kernels 421-424 to those shown in FIG. 4. For example, the center column from the "Y at R" kernel 421 is:

[−0.094750, 0.146750, 0.678000, 0.146750, −0.094750]

Transforming according to the single column kernel, the new center column is represented as:

$$-0.094750/2 = -0.047375$$

$$0.146750/2 = 0.073375$$

$$0$$

$$0$$

$$(-0.094750 - 0.094750)/2 + 0.678000 = 0.583250$$

$$0.146750/2 + 0.146750 = 0.220125$$

$$0$$

$$0$$

$$-0.094750/2 = -0.047375$$

This corresponds to the center column of the "Y at R" kernel 310 in FIG. 3.

For odd rows, the kernels are similar, but the items are permuted so the single-column kernel becomes:

$$[K_0 2, 0, 0, K_3/2+K_1, (K_0+K_4)/2+K_2, 0, 0, K_3/2, K_4/2] \quad \text{(eq. 5)}$$

In some embodiments, the U data and the V data can be respectively extracted in full resolution as the source image. However, in some other embodiments, the U data and the V data can be extracted as a lower resolution than the source image without causing significant negative visual impact as human eyes have less acuity for color differences than for luminance.

Figure 5:
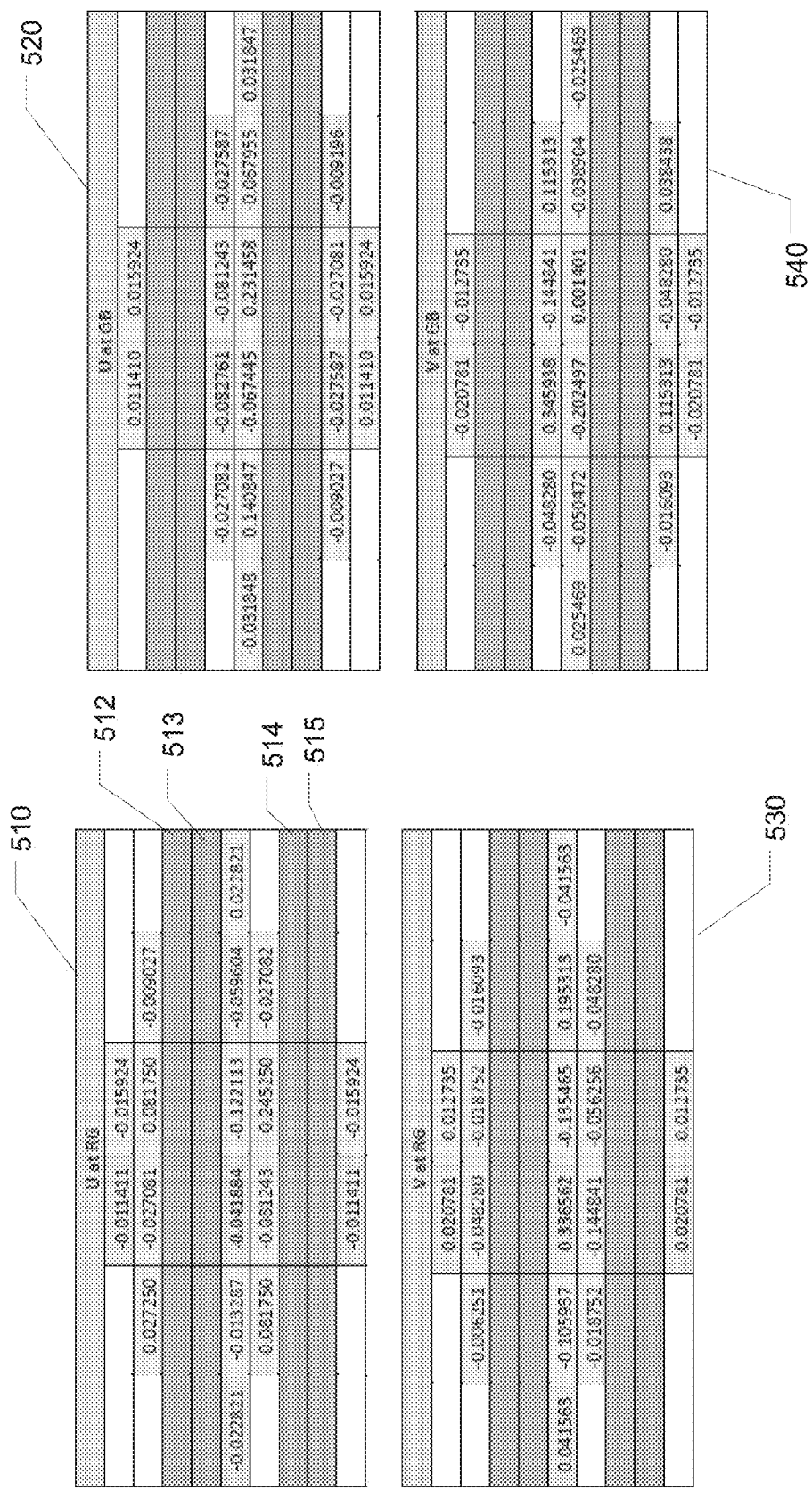
FIG. 5 provides exemplary convolution kernels that can be used in the convolution processes to extract UV component data from interleaved Bayer array data in half resolution in accordance with an embodiment of the present disclosure.

For example, the UV data can be extracted at half the horizontal resolution, resulting in the allocated size of the combined UV image identical to the source image. FIG. 5 provides exemplary convolution kernels 510, 520, 530 and 540 that can be used in the convolution processes to extract UV components from interleaved Bayer array data in half resolution in accordance with an embodiment of the present disclosure. In this example, the Bayer array source data include interleaved row pairs of long exposure and short exposure pixels and arranged in an RG/GB phase order, as shown in FIG. 1.

For this Bayer array pattern, two U convolution kernels, 510 and 520, and two V convolution kernels, 530 and 540, can be used. Each of the kernels 510-540 is configured as a 9×3 grid that has 18 taps. Taking the kernel 510 as an example, the center pair of taps (with values −0.041884 and −0.122113) corresponds to the currently sampled horizontal pair of pixels. The empty rows 512-515 correspond to the neighbor pixels associated with the opposite exposure setting which are excluded from the present convolution computation. In addition to computing U and V values at those positions, these kernels effectively perform a 2× horizontal box filter to average pairs of U and V values horizontally.

In some embodiments, the source data can be processed again before UV convolutions. During the UV convolution process, the currently sampled pixels can be normalized; the black bias can be subtracted; and white balancing can be performed on each source pixel, which is clamped to the [0-1] range before convolution. The redundant math is performed because it reduces both memory consumption and memory bandwidth requirements, at the expense of increased arithmetic.

Unlike the Y demosaicing process, the U and V values are not clamped to zero, since negative numbers are legitimate chroma values. If the current pixel is on a short exposure row, both U and V values can be multiplied by the long/short exposure ratio. The resulting UV pairs can be stored as normalized FP 16 numbers, FP 20 numbers, or any other suitable format.

The convolution kernels shown in FIG. 5 can be adapted to apply on a Bayer array of any phase order. To apply on a Bayer array of a GR/GB phase order, the kernels shown in FIG. 5 should be mirrored left-to-right. To apply on a Bayer array of a GB/RG phase order, the kernels shown in FIG. 5 should be mirrored top-to-bottom. To apply on a Bayer array of a BG/GR phase order, the kernels shown in FIG. 5 should be mirrored left-to-right and top-to-bottom which is equivalent to a 180-degree rotation.

The U/V convolution kernels presented in FIG. 5 can be derived from given RGB demosaicing kernels. The following industry-standard equations can be used to combine the RGB kernels 411-414 in FIG. 4 into U and V kernels shown in FIG. 6A:

$$U=-0.14713R-0.28886G+0.436B$$

$$V=0.615R-0.51499G-0.10001B$$

Figure 6A:
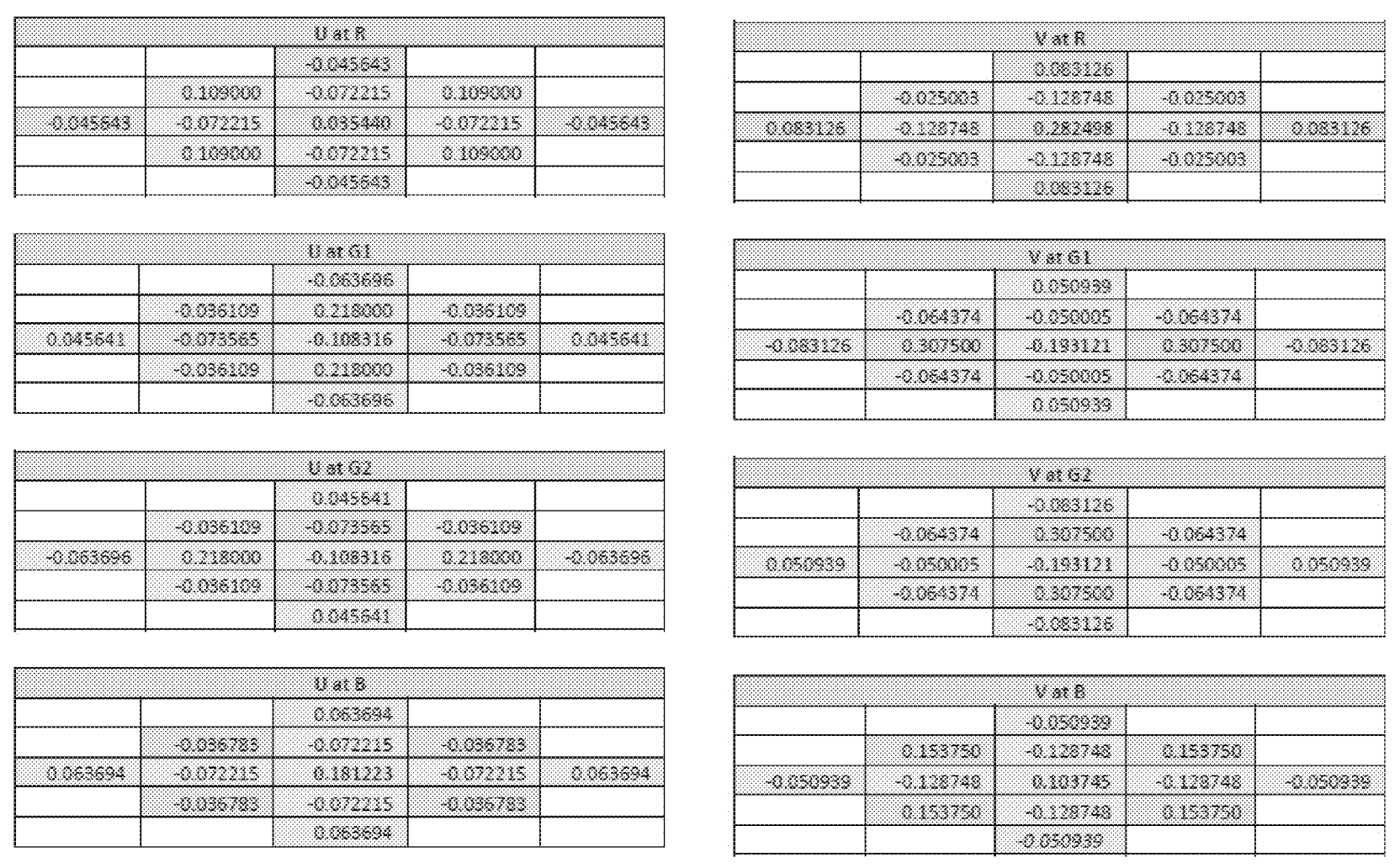
Figure 6B:
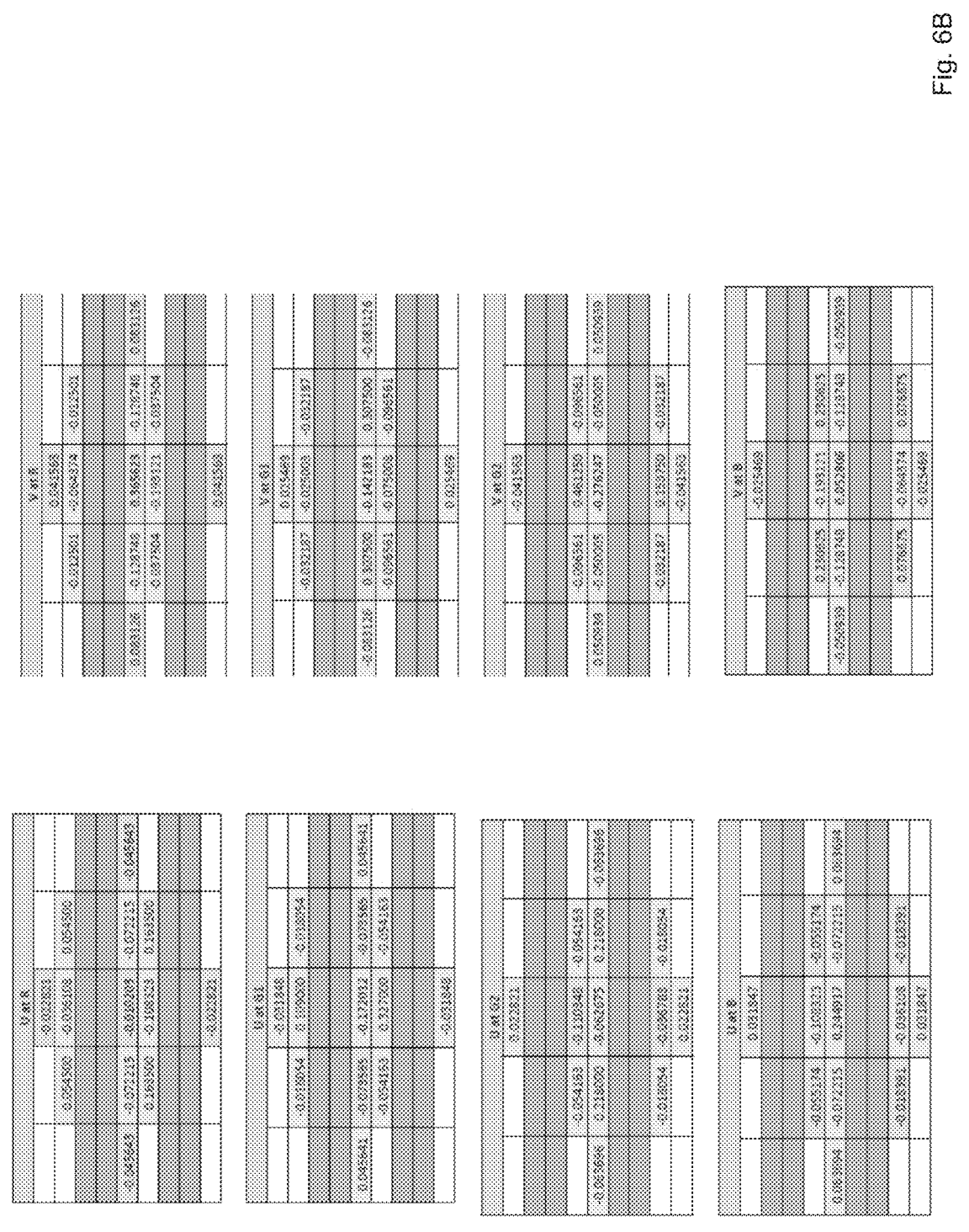

FIG. 6A presents the intermediate U/V demosaicing kernels before the long/short exposure row interleaving pattern is taken into account. FIG. 6B presents the intermediate U/V demosaicing kernels with the long/short exposure row interleaving pattern being taken into account. The intermediate U/V demosaicing kernels in FIG. 6B can be derived using equations (eq. 4) and (eq. 5).

The final desired value for U on RG rows is the average of U at R and U at G1; for U on GB rows it is the average of U at G2 and U at B; for V at RG rows it is the average of V at R and V at G1; and for V at GB rows it is the average of V at G2 and V at B. Rather than performing two 13-tap convolutions and averaging the result, the kernels themselves are combined to produce an 18-tap convolution as shown in FIG. 5.

The intensity and chroma component of the interleaved source data can also be extracted in any suitable mechanism that is well known in the art.

Figure 7:
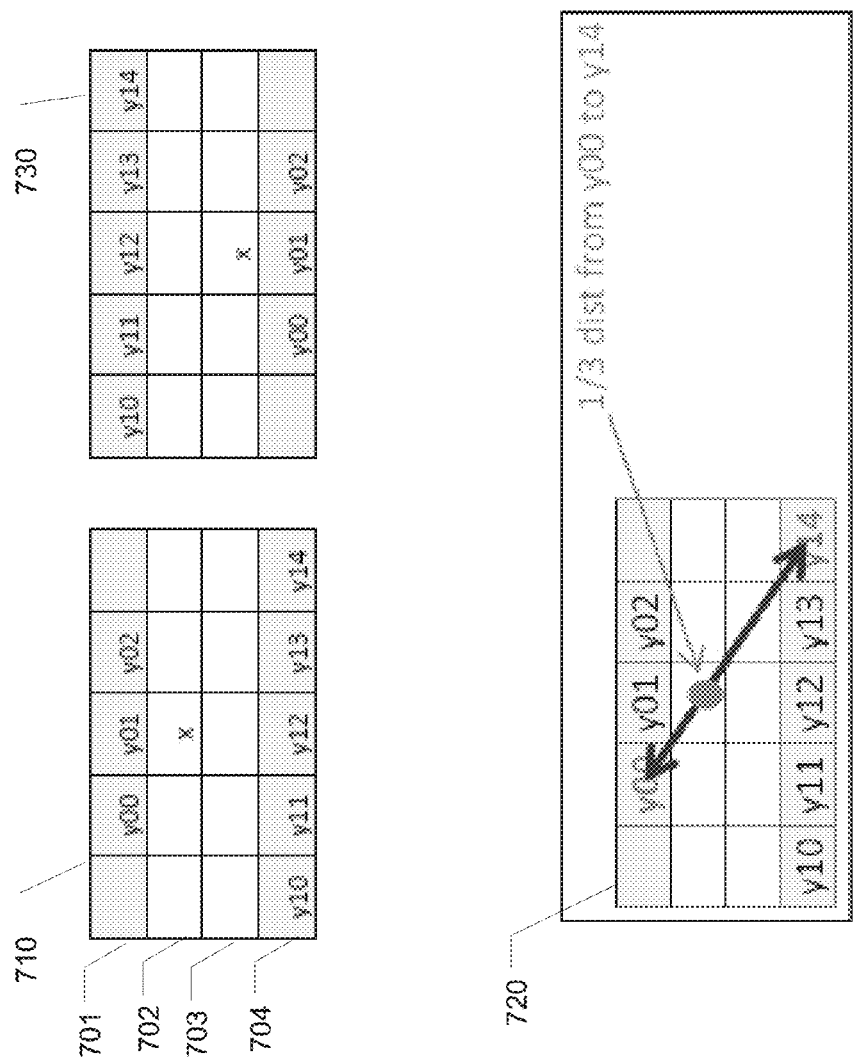
FIG. 7 illustrates an exemplary interpolation method that can be used to deinterleave data of the long or short exposure image in the YUV color space in accordance with an embodiment of the present disclosure.

The interleaved Y image data and the UV image data derived from the demosaicing process described above results in half frame image data and can be deinterleaved based on the exposure settings of the pixels, and then interpolated to produce full frame short exposure YUV data and full frame long exposure YUV data. FIG. 7 illustrates an exemplary interpolation method that can be used to interpolate deinterleaved data in the YUV color space in accordance with an embodiment of the present disclosure. The long- and short exposure image data can be interpolated separately.

For example, assume diagrams 710, 720 and 730 represent fragments of long exposure YUV data derived from the demosaicing convolution process. Rows 701 and 704 encompasses the long exposure Y data derived from the Y convolution process; while Y values of pixels of rows 702 and 703 are to be filled by interpolating the pixels of rows 701 and 704.

In this example, the interpolation is performed in accordance with a minimum delta diagonal method. With respect to generating a Y value for a center pixel (marked with "x") located at the upper row 702 of a row pair 702 and 703, the diagram 710 illustrates the location of the 8 local neighbor pixels, y00, y01, y02, y10, y11, y12, y13 and y14, from which five diagonals can be constructed:

D1: diagonal from y00 to y14;
D1_5: diagonal from (y00+y01)/2 to y13
D2: diagonal from y01 to y12;
D2_5: diagonal from (y01+y02)/2 to y11; and
D3: diagonal from y02 to y10.

From these 8 samples, 5 diagonals are constructed. The absolute Y deltas of these 5 diagonals are compared, and the diagonal with the minimum delta is selected for interpolation. U and V values corresponding to the minimum delta diagonal are fetched. The Y, U, and V values from the endpoints are interpolated ⅓ of the way from the row 701 to the row 702 and used as an averaged value, as illustrated in diagram 720.

Similarly, with respect to generating a Y value for a center pixel (marked with "x") located at the lower row 703 of a row pair 702 and 703, the diagram 720 illustrates the location of the 8 local neighbor pixels, y10, y01, y02, y13, y11, y12, y13 and y14, from which another five diagonals can be constructed.

Figure 8A:
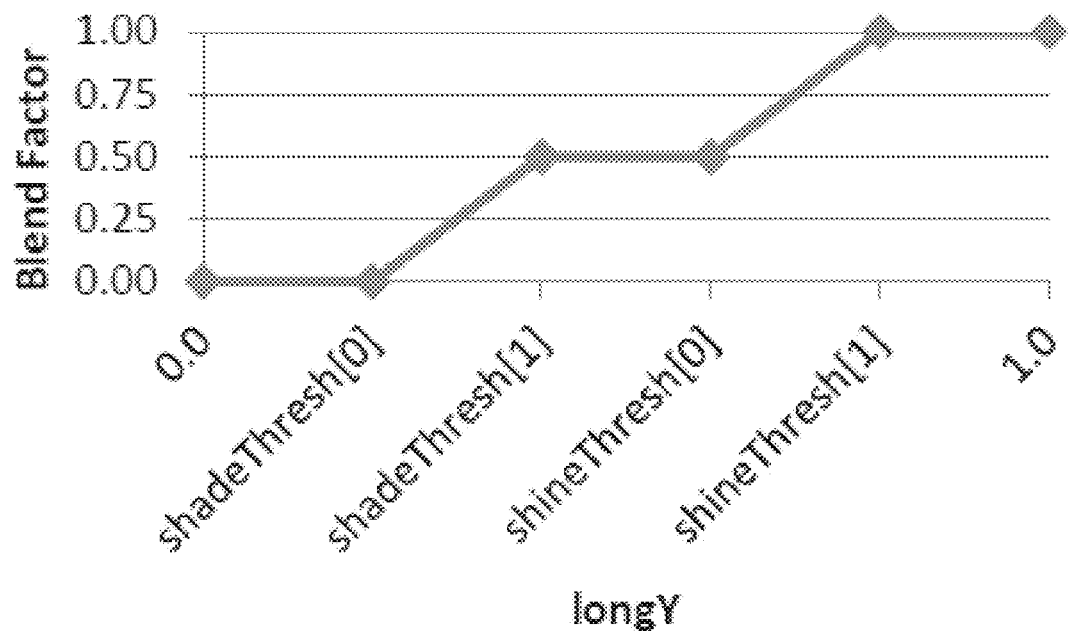
FIG. 8A illustrates an exemplary generalized "sideways-Z" curve that can be used to determine the blending factors when blending the deinterleaved long and short exposure images.
Figure 8B:
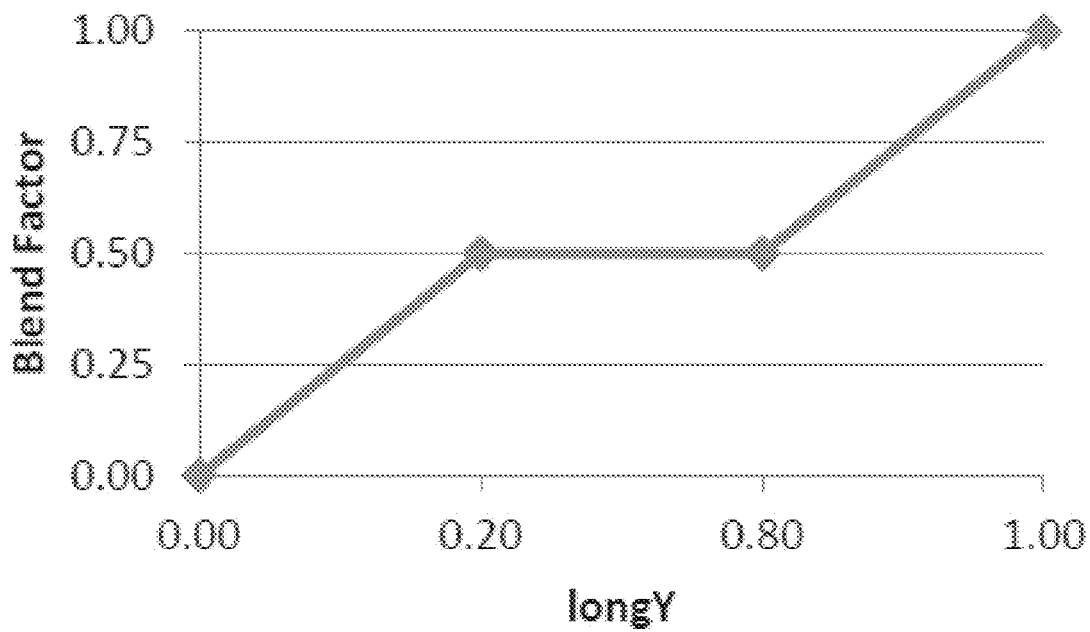
FIG. 8B illustrates an exemplary "sideways-Z" curve that can be used to determine the blending factors wherein the thresholds for longY are 0.0, 0.2, 0.8 and 1.

The current YUV data and the averaged YUV data are sorted into a "shortYUV" and "longYUV" data, depending on whether the current pixel is on a short exposure or long exposure row. The short YUV and longYUV values represent full image data each. Subsequently, a blend factor is selected to blend the shortYUV and longYUV values for a particular pixel to derive the HDR pixel. FIG. 8A illustrates an exemplary generalized "sideways-Z" curve that can be used to determine the blending factors used to select the HDR data. The long exposure Y values, longY, are the input to the curve and are categorized to several levels according to predefined thresholds, represented as shadeThresh[0], shadeThresh[1], shineThresh[0], and shineThresh[0]. In each level, the blending factor curve corresponds to a respective linear curve. In some embodiments, values of {0.0, 0.2} for the shadeThresh and {0.8, 1.0} for the shineThresh can be used, as shown in FIG. 8B. FIG. 8B illustrates an exemplary "sideways-Z" curve that can be used to determine the blending factors wherein the level thresholds for longY are 0.0, 0.2, 0.8 and 1.

As will be appreciated by those skilled in the art, the present disclosure is not limited to any specific blending factors or any specific form of a blending factor curve. In some embodiments, two blending curves, one for long rows and one for short rows, may be implemented. Additionally, the "plateau" at 0.50 is actually configurable. In some application programs, these parameters can be tuned based on lighting conditions.

Once the blend factor is selected, the longYUV and shortYUV can be converted to a long and short red, green, or blue sample depending on the current Bayer phase. The industry-standard inverse transformation from YUV to RGB can be used:

$$R=Y+1.3983*V$$

$$G=Y-0.39465*U-0.58060*V$$

$$B=Y+2.03211*U$$

A final R, G, or B value is interpolated between the short[RGB] and long[RGB] based on the blend factor. A blend factor of 0.0 implies that only the long pixel contributes; a factor of 1.0 implies that only the short pixel contributes.

In some embodiments, this final sample value is clamped to a minimum of zero, and then raised to a power of less than 1 (e.g., 0.436295) to "compand" the value—boosting midtones and darkening highlights, and moving more values into the [0-1] range. Finally, the sample is clamped to a maximum of 1, multiplied by a "denormalization factor" and stored as a denormalized FP16 value, which allows subsequent fixed-point processing to proceed correctly.

Figure 9B:
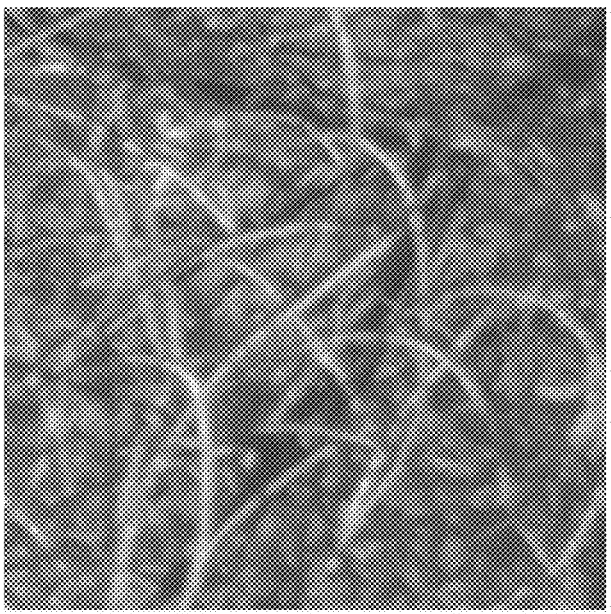
FIG. 9B is a sample image that is generated by deinterleaving the source image in YUV color space in accordance with an embodiment of the present disclosure.
Figure 9A:
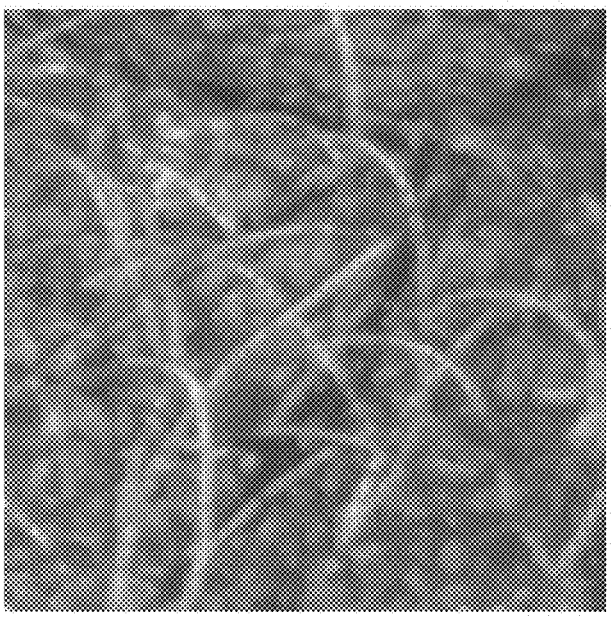
FIG. 9A is a sample image that is generated by deinterleaving the source image in mosaic space in accordance with the prior art.

FIG. 9A is a sample image that is generated by deinterleaving source image in mosaic space in accordance with the prior art. This sample image demonstrates sampling artifacts due to the low sampling frequency used in the deinterleaving process. FIG. 9B is a sample image that is generated by deinterleaving source image in a YUV color space in accordance with an embodiment of the present disclosure. By contrast, FIG. 9B demonstrates higher image quality resulted from the higher sampling frequency afforded by conversion to the YUV color space.

An image processing method according to the present disclosure, e.g., as described with reference to FIG. 1-FIG. 8, can be performed on any suitable processing unit, such as a central processing unit (CPU), or a graphic processing unit (GPU).

Figure 10:
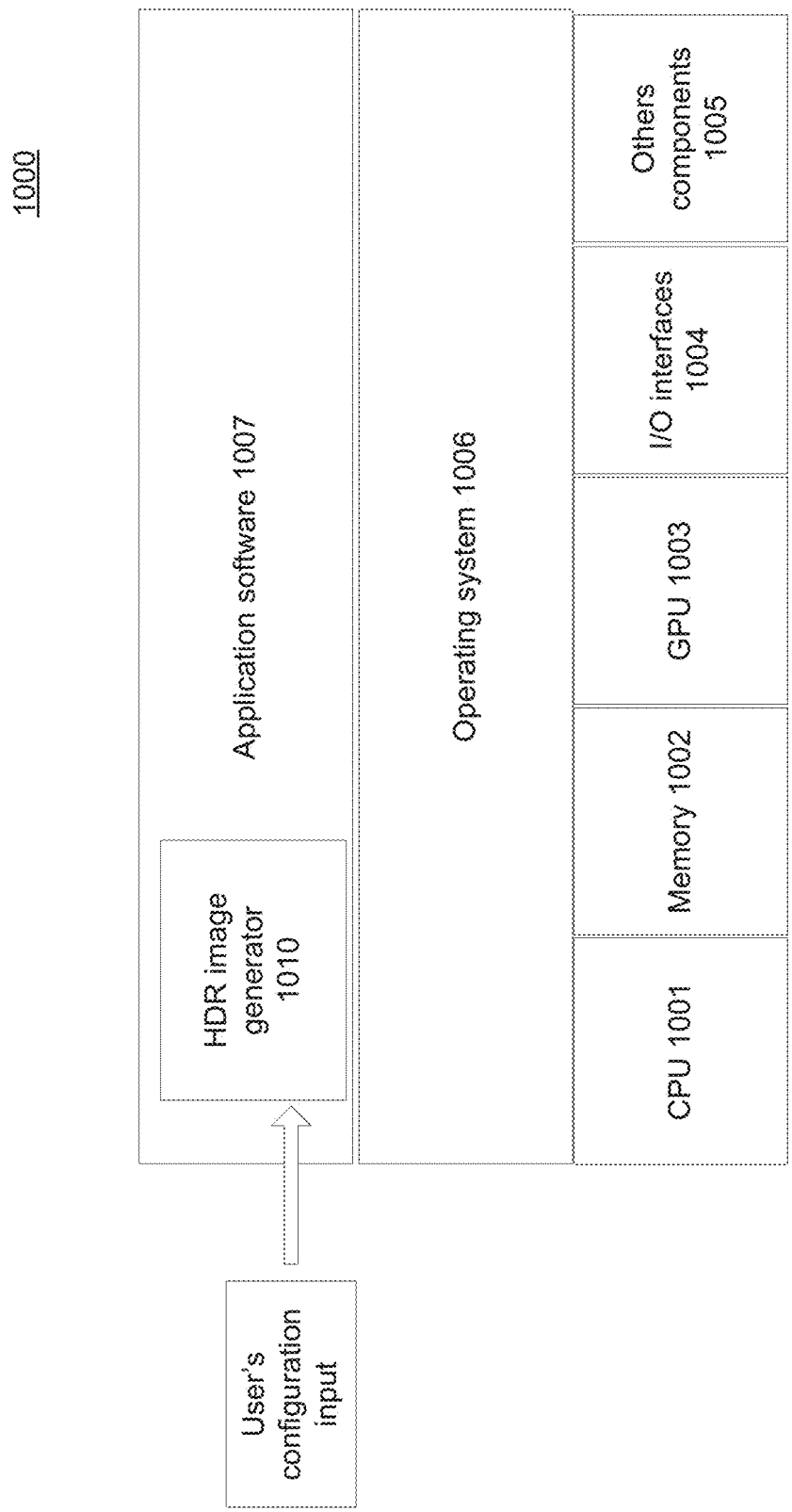
FIG. 10 is a block diagram illustrating an exemplary computing system including an HDR image generator in accordance with an embodiment of the present disclosure.

FIG. 10 is a block diagram illustrating an exemplary computing system 1000 including an HDR image generator 1010 in accordance with an embodiment of the present disclosure. The system may be a digital camera, a video camera, image processing device, a mobile computing device, a desktop, and etc.

The computing system comprises a CPU 1001, a system memory 1002, a GPU 1003, I/O interfaces 1004 and other components 1005, an operating system 1006 and application software 1007 including the a HDR image generator 1010 stored in the memory 1002. When incorporating the user's configuration input and executed by the CPU 1001 or the GPU 1003, the HDR image generator 1010 can process interleaved image data and generate HDR images in accordance with an embodiment of the present disclosure. An HDR image generator 1010 may include various components or modules to perform functions of YUV data extraction, deinterleaving, interpolation and blending, etc. The user configuration input may include, source image data, a long/short exposure ratio, user-selection of convolution kernels, user-election of an intermediate color space, and a blending curve for example. An HDR image generator 1010 may be an integral part of a graphic simulation tool, a processing library, or a computer game that is written in Fortran, C, C++, or any other programming languages known to those skilled in the art. For example, the program 1010 can be implemented as a multi-pass OpenGL ES shader on mobile processors.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of processing digital image data, said method comprising:
    accessing first image data representing a captured image that comprises a plurality of pixels represented by a first color space and arranged in a Bayer array, wherein said plurality of pixels comprise: first exposure pixels associated with a first exposure duration of said captured image; and second exposure pixels associated with a second exposure duration of said captured image, and wherein said first exposure pixels and said second exposure pixels are interleaved in said Bayer array;
    determining first luminance data and first chrominance data from said first exposure pixels of said first image data, wherein said first luminance data and said first chrominance data are represented by a second color space;
    determining second luminance data and second chrominance data from said second exposure pixels of said first image data, wherein said second luminance data and said second chrominance data are represented by said second color space;
    interpolating said first luminance data and said first chrominance data in said second color space to produce a first exposure image;
    interpolating said second luminance data and said second chrominance data in said second color space to produce a second exposure image; and
    generating a high dynamic range image by blending said first exposure image and said second exposure image.

2. The method of claim 1, wherein said first color space is an RGB color space, and wherein said second color space is a YUV color space.

3. The method of claim 2, wherein said determining comprise:
    converting said first image data to interleaved luminance data and interleaved chrominance data using convolution;

deinterleaving said interleaved luminance data to said first luminance data and said second luminance data; and deinterleaving said interleaved chrominance data to said first chrominance data and said second chrominance data.

4. The method of claim 3, wherein said converting said first image data comprises:

determining a Y value for each pixel of said plurality of pixels by performing a convolution between a Y demosaicing kernel and said first image data of each pixel and neighbor pixels of each pixel;

determining a U value for each horizontal pair of pixels of said plurality of pixels by performing a convolution between a U demosaicing kernel and said first image data for each horizontal pair and neighbor pixels of each horizontal pair; and determining a V value for each horizontal pair by performing a convolution between a V demosaicing kernel and said first image data for each horizontal pair and neighbor pixels of each horizontal pair.

5. The method of claim 4, wherein said neighbor pixels of each pixel are associated with a same exposure duration as each pixel, and wherein said neighbor pixels of each horizontal pair are associated with a same exposure duration as each horizontal pair.

6. The method of claim 4, wherein said Y demosaicing kernel comprises a 9×5 array including 13 taps and is dependent on a color channel of said pixel in said first color space and a mosaic pattern of said Bayer array;

wherein said U demosaicing kernel comprises a 9×3 array including 18 taps and is dependent on color channels of said horizontal pair of pixels in said first color space and said mosaic pattern; and wherein said V demosaicing kernel comprises a 9×3 array including 18 taps and is dependent on color channels of said horizontal pair of pixels in said first color space and said mosaic pattern.

7. The method of claim 4 further comprising:

normalizing said first image data before said converting;

performing black bias subtraction on said first image data before said converting;

performing white balancing on said first image data before said converting; and storing determined Y values, determined U values and determined V values as normalized floating point numbers.

8. The method of claim 1, wherein said Bayer array comprises alternating row pairs of first exposure pixels and second exposure pixels, and wherein said interpolatings comprise:

interpolating said first luminance data and said first chrominance data in accordance with a minimum delta diagonal method; and interpolating said second luminance data and said second chrominance data in accordance with a minimum delta diagonal method.

9. The method of claim 1, wherein said high dynamic range image is of said second color space, and wherein blending comprises blending said first exposure image and said second exposure image in accordance with predetermined blending factors, and further comprising, converting said high dynamic range image of said second color space to a resultant image of said first color space.

10. A computer implemented method of generating a high dynamic range (HDR) image, said computer implemented method comprising accessing interleaved image data representing a captured frame that comprises a plurality of pixels, wherein said plurality of pixels comprise first exposure pixels associated with a first exposure duration; and second exposure pixels associated with a second exposure duration, wherein said interleaved image data are represented by a first color space and arranged in a mosaic pattern, and wherein said first exposure pixels and said second exposure pixels are interleaved in a predetermined pattern;

generating first exposure data in a second color space from said first exposure pixels of said captured frame using convolution;

generating second exposure data in said second color space from said second exposure pixels of said captured frame using convolution; and generating a resultant image representing said captured frame in said first color space based on blending said first exposure data with said second exposure data.

11. The computer implemented method of claim 10, wherein said generating said first exposure data comprises:

converting said first exposure pixels of said interleaved image data to first intensity data and first chroma data represented in said second color space by performing convolution; and interpolating said first intensity data and first chroma data to produce said first exposure data, and wherein said generating said second exposure data comprises:

converting said second exposure pixels of said interleaved image data to second intensity data and second chroma data represented in said second color space by performing convolution; and interpolating said second intensity data and second chroma data to produce said second exposure data.

12. The computer implemented method of claim 11, wherein said first color space corresponds to an RGB color space, wherein said mosaic pattern is an RG/GB mosaic pattern, wherein said predetermined pattern is a Bayer array comprising alternating scanline pairs of first exposure pixels and second exposure pixels, and wherein said second color space is selected from a group consisting of YUV color space, YIQ color space, YCbCr color space, and HSL color space.

13. The computer implemented method of claim 11, wherein said converting said first exposure pixels of said interleaved image data to said first intensity data and said first chroma data comprises:

performing a convolution between a Y demosaicing kernel and said first exposure pixels and adjacent pixels of said first exposure pixels;

performing a convolution between a U demosaicing kernel and said first exposure pixels and adjacent pixels of said first exposure pixels; and performing a convolution between a V demosaicing kernel and said first exposure pixels and adjacent pixels of said first exposure pixels, wherein said Y demosaicing kernel, U demosaicing kernel, and said V demosaicing kernel are respectively selected based on color channels of said first exposure pixels and said adjacent pixels.

14. The computer implemented method of claim 11, wherein said interpolating said first intensity data and said first chroma data comprises interpolating first exposure pixels of said first intensity data and said first chroma data to produce second exposure pixels of said first intensity data and said first chroma data in accordance with a minimum delta diagonal method.

15. The computer implemented method of claim 11, wherein said generating said resultant image comprises:
   averaging said first intensity data and said second intensity data by using predetermined blending factors;
   averaging said first chroma data and said second chroma data by using predetermined blending factors; and
   converting averaged intensity data and averaged chroma data to resultant image data representing said captured frame in high dynamic range, wherein said resultant image data is in said first color space.

16. A system comprising
   a processor; and
   a memory coupled to said processor and storing an image processing program, said image processing program comprising instructions that cause said processor to perform a method of generating a high dynamic range image, said method comprising:
      accessing interleaved image data representing a captured frame that comprises a plurality of pixels, wherein said plurality of pixels comprise first exposure pixels associated with a first exposure duration; and second exposure pixels associated with a second exposure duration, wherein said interleaved image data are arranged in a Bayer pattern, and wherein said first exposure pixels and said second exposure pixels are interleaved by alternating scanline pairs;
      deriving first exposure data in a YUV color space from said first exposure pixels of said interleaved image data using convolution, wherein said first exposure data represents said captured frame;
      deriving second exposure data in said YUV color space from said second exposure pixels of said interleaved image data using convolution, wherein said second exposure data represents said captured frame; and
      generating a high dynamic range image in said first color space based on said first exposure data and said second exposure data.

17. The system of claim 16, wherein said first exposure data comprise first exposure Y data and first exposure UV data, and wherein said second exposure data comprise second exposure Y data and second exposure UV data, and wherein said derivings comprise:
   generating interleaved Y data comprising a Y value for each pixels of said plurality of pixels, wherein said Y value is computed by a convolution between a Y kernel array and a set of pixels of said interleaved image data, wherein said set of pixels include said pixel and neighbor pixels of said pixel and are associated with a same exposure duration; and
   interpolating said interleaved Y data into said first exposure Y data and said second exposure Y.

18. The system of claim 17, wherein said interpolating comprises interpolating 8 first exposure pixels of said first exposure Y data to derive a Y values for a second exposure pixel of said first exposure Y data in accordance with a minimum diagonal delta method.

19. The system of claim 17, wherein said derivings further comprise:
   generating interleaved UV data comprising a U value and a V value for each horizontal pair of said plurality of pixels; and
   interpolating said interleaved UV data into said first exposure UV data and said second exposure UV data in accordance with a minimum diagonal delta method.

20. The system of claim 16, wherein said generating said high dynamic range image comprises:
   converting said first exposure data to first RGB data representing said captured frame in said first exposure;
   converting said second exposure data to second RGB data representing said captured frame in said second exposure; and
   blending said first RGB data and said second RGB data to generate resultant RGB data representing said high dynamic range image.

* * * * *